(12) United States Patent
Bibliowicz et al.

(10) Patent No.: US 8,024,661 B2
(45) Date of Patent: Sep. 20, 2011

(54) COLLABORATION FRAMEWORK

(75) Inventors: Jacobo Bibliowicz, Ithaca, NY (US); Carolyn E. Kreisel, Ithaca, NY (US); Robert Lipari, Alpine, NY (US); Ryan P. Rogers, Newfield, NY (US)

(73) Assignee: Autodesk, Inc., San Rafael, CA (US)

( * ) Notice: Subject to any disclaimer, the term of this patent is extended or adjusted under 35 U.S.C. 154(b) by 923 days.

(21) Appl. No.: 11/923,548

(22) Filed: Oct. 24, 2007

(65) Prior Publication Data

US 2008/0046828 A1 Feb. 21, 2008

Related U.S. Application Data

(63) Continuation of application No. 09/982,224, filed on Oct. 18, 2001, now abandoned.

(51) Int. Cl.
*G06F 3/00* (2006.01)
(52) U.S. Cl. .......................... 715/751; 715/753
(58) Field of Classification Search .................. 715/751, 715/753, 757
See application file for complete search history.

(56) References Cited

U.S. PATENT DOCUMENTS

| | | | |
|---|---|---|---|
| 5,408,470 A * | 4/1995 | Rothrock et al. | 370/261 |
| 5,938,724 A | 8/1999 | Pommier et al. | |
| 6,057,854 A | 5/2000 | Davis, Jr. et al. | |
| 6,067,551 A | 5/2000 | Brown et al. | |
| 6,195,751 B1 | 2/2001 | Caronni et al. | |
| 6,342,906 B1 | 1/2002 | Kumar et al. | |
| 6,608,628 B1 | 8/2003 | Ross et al. | |

OTHER PUBLICATIONS

Whiteboard, Microsoft Windows Technologies, 1999—http://microsoft.com/windows/NetMeeting/Features/Whiteboard/default.ASP, pp. 1.

* cited by examiner

*Primary Examiner* — Dennis Bonshock
(74) *Attorney, Agent, or Firm* — Gates & Cooper LLP

(57) ABSTRACT

A method, apparatus, and article of manufacture enables users to collaborate on an actual stored drawing document across a network. A single document is stored on a server who establishes a collaboration session with multiple users that collaborate in real time and dynamically view modifications executed by the users. Users maintain simultaneous write access to the document. Asynchronous commands are received from users, that have a delay of a defined time period, include any modifications made in real time by the user transmitting the asynchronous command, and cause the server to transmit any modifications to all of the multiple users in the collaboration session. The server also maintains a history of all modifications to the actual stored drawing document. The history can be used by a user to undo any user's modifications.

13 Claims, 3 Drawing Sheets

COLLABORATION FRAMEWORK

CROSS-REFERENCE TO RELATED APPLICATIONS

This application claims the benefit under 35 U.S.C. Section 120 of the following co-pending and commonly-assigned U.S. utility patent application(s), which is/are incorporated by reference herein:

Utility application Ser. No. 09/982,224, filed Oct. 18, 2001, by Jacobo Bibliowicz, Carolyn E. Kreisel, Robert Lipari, and Ryan P. Rogers, entitled COLLABORATION FRAMEWORK.

This application is related to the following co-pending and commonly-assigned patent applications, which applications are incorporated by reference herein:

Patent Cooperation Treaty Patent Application Serial No. PCT/US01/02310, entitled "METHOD AND APPARATUS FOR PROVIDING ACCESS TO AND WORKING WITH ARCHITECTURAL DRAWINGS ON THE INTERNET", by Douglas G. Look, et. al., filed on Jan. 24, 2001, which application claims priority to U.S. Provisional Patent Application Ser. No. 60/177,988, entitled "METHOD AND APPARATUS FOR PROVIDING ACCESS TO AND WORKING WITH ARCHITECTURAL DRAWINGS ON THE INTERNET," filed on Jan. 25, 2000, by Douglas G. Look, et. al.

BACKGROUND OF THE INVENTION

1. Field of the Invention

The present invention relates generally to computer-implemented drawing programs, and in particular, to a method, apparatus, and article of manufacture for multiple collaborators to simultaneously work on a drawing.

2. Description of the Related Art

The use of Computer Aided Design (CAD) application programs is well known in the art. CAD application programs are often expensive, complex, and difficult to learn how to use. Additionally, architects, contractors, engineers, owners, and other parties involved with a project (referred to as project participants or collaborators) are often mobile or at different locations. With new technology and the increased use of the Internet, project participants often have computers, Internet access, and personal digital assistants (PDAs). Further, the coordination and exchange of information between project participants can be increasingly complex.

Existing prior art applications allow a user to download a drawing, edit the drawing, and upload the drawing after completing the edits. Alternatively, prior art applications/features may allow the creation of a two-dimensional in-memory document where graphic information is transmitted from one client to another client during a session. However, in such prior art applications, to refer to a document in the future (i.e., to store the document), the document must be saved locally by a client and then uploaded later. Further, since only an in-memory document is used, there is no capability to undo a modification or to restore the document in the event of a network or computer failure. Further, only a primitive set of two-dimensional graphic manipulation tools is often provided.

Accordingly, existing prior art applications do not provide the ability for multiple users to collaborate on an actual stored document with a full set of modeling tools (in two and three dimensions).

SUMMARY OF THE INVENTION

One or more embodiments of the invention provide a method, apparatus, and article of manufacture for a collaboration framework that permits multiple users to simultaneously modify a document/workspace that is stored on a server across a network. Collaboration applications on multiple clients/collaborators communicate with a server application on a server.

The collaboration application provides a full set of three-dimensional drawing tools to manipulate a drawing and transmit such manipulations to the server application. The server application maintains a history of the manipulations and the collaborators in a session. Once a manipulation command is received by the server application from one collaborator, the server distributes the command to the remaining collaborators. Thereafter, the collaboration applications modify the local version of the drawing space in accordance with the command. The history maintained by the server may then be used by any one of the collaborators to rollback a modification (e.g., a modification made by another collaborator or themselves) or to rebuild a drawing space in the event of a network failure.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

A collaboration framework provides the ability for multiple users to simultaneously modify a document across a network using a full set of tools. Client based applications generate specific messages (e.g., XML messages) which are communicated across a network to a server (e.g., via TCP/IP [transmission control protocol/internet protocol]). Once received by the server, the server manages the collaboration session by storing document changes and distributing the command to other collaborators. The server maintains a history of document changes so these can be recommunicated in the event of a network failure or temporary Internet outage. Additionally, the server may manage a record of the collaboration session including the name, number and status of collaborators, and similar information for the workspace being collaborated on.

Hardware Environment

Figure 1:
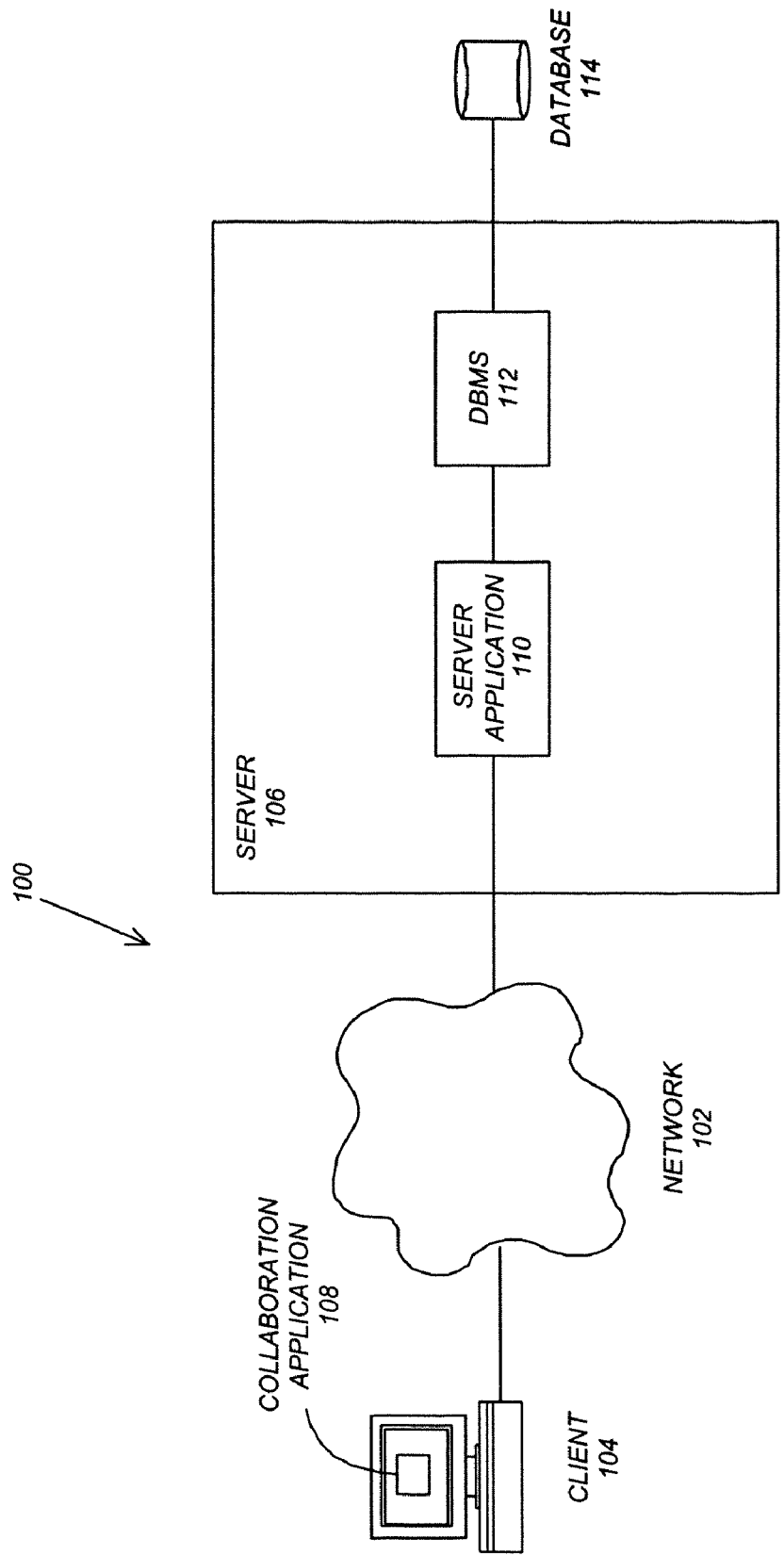
FIG. 1 schematically illustrates a hardware and software environment in accordance with one or more embodiments of the invention.

FIG. 1 schematically illustrates a hardware and software environment in accordance with one or more embodiments of the invention, and more particularly, illustrates a typical distributed computer system 100 using a network 102 to connect client computers/collaborators 104 to server computers 106.

A typical combination of resources may include a network 102 comprising the Internet, LANs (local area networks), WANs (wide area networks), or the like, clients/collaborators 104 that are personal computers, personal digital assistants (PDAs), or workstations, and servers 106 that are personal computers, workstations, minicomputers, or mainframes.

In accordance with one or more embodiments of the invention, the network 102 connects collaborators 104 executing a collaboration application 108 to server computers 106 executing server applications 110. The collaboration application 108 enables collaborators 104 to communicate with other collaborators 104 and work on a document stored on/by server 106. The server application 110 may be a server 106 collaboration application that provides for storage of a commonly used document and enables the ability for multiple collaborators 104 to simultaneously work on the same document. Server application 110 may also be configured to manipulate data (e.g., a document) in database 114 through a database management system (DBMS) 112.

Generally, these components 108, 110, 112, and 114 all comprise logic and/or data that is embodied in or retrievable from device, medium, signal, or carrier, e.g., a data storage device, a data communications device, a remote computer or device coupled to the computer across a network or via another data communications device, etc. Moreover, this logic and/or data, when read, executed, and/or interpreted, results in the steps necessary to implement and/or use the present invention being performed.

Thus, embodiments of the invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass logic and/or data accessible from any computer-readable device, carrier, or media.

Those skilled in the art will recognize many modifications may be made to this exemplary environment without departing from the scope of the present invention. For example, those skilled in the art will recognize that any combination of the above components, or any number of different components, including different logic, data, different peripherals, and different devices, may be used to implement the present invention, so long as similar functions are performed thereby.

Collaboration Framework

Collaboration application 108 and server application 110 executing on client 104 and server 106 respectively, provide a collaboration framework that enables modifications to drawings to be shared in real time among a set of collaborators 104 (i.e., two or more users working simultaneously on the same document from different computers or other network 102 devices).

The collaboration framework provides the ability for all collaborators 104 to modify a document at the same time, with no need for permission to modify to be passed around among the collaborators 104. Once a collaborator 104 has joined a session, the collaborator 104 is likely on equal footing with all other collaborators 104. Thus, by default, anyone may join a collaboration session and begin collaborating with others that may already be working in the session. Alternatively, while multiple collaborators 104 may edit the document, another collaborator 104 may not have write access and may only have read capability to watch the modifications of other collaborators 104.

Collaboration Process

The initial user in a collaboration session opens a workspace or document to work on. Once opened, a collaboration palette may be displayed on the computer 104 by collaboration application 108. For example, the palette may be placed in the lower-right corner of the window representing collaboration application 108. Alternatively, when not in use, the palette may roll-up or be hidden from the user.

The collaboration palette provides information on the current collaborators/users 104 in the collaboration session. Thus, when a document is opened by a user, the user's name is added to the collaboration palette. Further, an access level may be assigned to the user. For example, a user's access level may default to "write-access". Beyond this general information, the palette may not open or show any additional feedback when the initial user opens a workspace.

Figure 2:
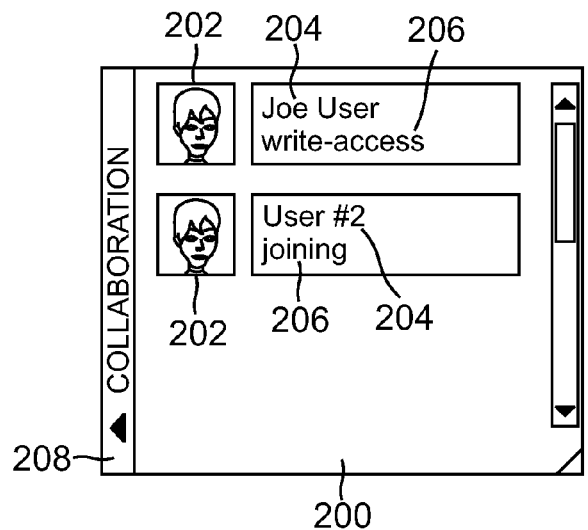
FIG. 2 illustrates a collaboration palette displayed in accordance with one or more embodiments of the invention.

FIG. 2 illustrates a collaboration palette displayed in accordance with one or more embodiments of the invention. As illustrated, elements of the collaboration palette 200 may include a user image/icon 202. The icon 202 used for the user may be a standard 32×32 GIF (graphic image format) for all users.

In addition, the top line 204 of a data area of palette 200 may contain the user's name. Further, the second line 206 of the data area may contain the user's status. Each status type 206 may have an associated color. For example, the status types 206 and colors a user may have are joining (green), write-access (black), accidental disconnect (red), intentional disconnect (yellow), and working offline (blue). In order to show a status change, all of the status labels, except "joining," may blink then disappear after a short duration. The joining status may remain until the user either connects or cannot connect to the workspace.

Figure 3:
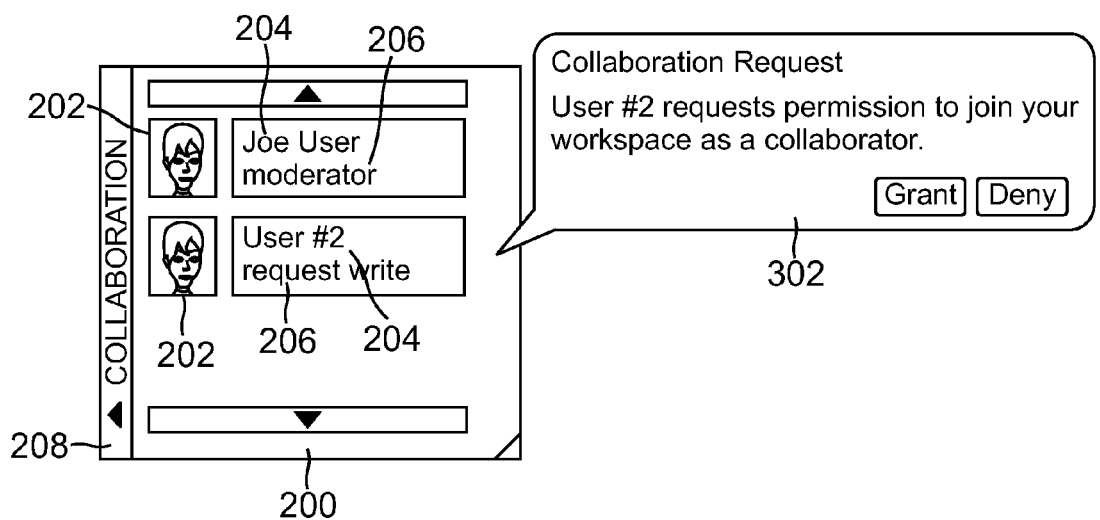
FIG. 3 illustrates a dialog window and collaboration palette in accordance with one or more embodiments of the invention.

A user's status 206 may also reflect a controlled environment wherein a single user may be a moderator that has the ability to grant or deny access to new and existing users. FIG. 3 illustrates a dialog window in such a controlled environment. As illustrated, the status field 206 may identify the first user as a moderator. Further, when a new user attempts to join a session, the status field 206 may display a message such as "request write" to indicate that a user is requesting write access. Additionally, a dialog window 302 may be presented to the moderator that allows the moderator to grant or deny the new user permission to join the workspace as a collaborator 104. Advanced options may also be available such as allowing a user to join the session but with read-only capability.

A scroll bar may be activated on the palette if necessary to display additional information. Further, a palette titlebar 208 includes the title of the palette 200 and may flash for a short duration when the status of any collaborator 104 changes. The color the titlebar 208 flashes may depend on the new status of the collaborator.

When a second user opens a document or workspace, the workspace opens as usual on the user's computer 104, along with opening the collaboration palette 200 to signal the beginning of a collaboration session. However, the collaboration palette 200 automatically indicates that another user has the workspace open already.

The palette 200 also provides a mechanism for displaying the status 206 of the second user's connection to the workspace. When initially opened, the second user's status 206 likely reads "joining." When the second user successfully joins the collaboration session, the status line 206 changes to "write-access." Thereafter, if current users of the workspace have closed the collaboration palette 200, the titlebar 208 may flash to signify the addition of a user to the workspace.

As the workspace is being opened for a second user, a "glass plane" may be placed over the workspace, palettes 200, and menu. Further, in some embodiments, a user may not be able to cancel the open, or start to open another workspace until the current one is fully opened. As illustrated in FIG. 2, the palette 200 indicates that a first user (i.e., "Joe User") has write-access and a second user (i.e., "User #2") is joining the session.

Accordingly, as users join the session, each user's collaboration palette 200 indicates the addition of a user, with a status 206 of "joining." When a user leaves the workspace on purpose, the user's status 206 (e.g., "left workspace") may be shown in a specific color (e.g., yellow), and after some amount of time, the user's name 204 will be removed from the palette 200. Similarly, if a user leaves the workspace accidentally, the user's status 206 (e.g., "disconnected") may be shown in a different color (e.g., red), and after some amount of time, the user's name 204 will be removed from the palette 200.

Once a session has begun, modifications to the drawing may be seen by any users in the session. For example, a pan or zoom operation performed on the workspace by a user will be reflected in other users' view of the workspace. Accordingly, the pan and zoom state of the workspace may be stored with the document. Thereafter, the next time the workspace is opened, the view will be the same as when it was last closed. Similarly, if the view of a 3D model is changed by a user, the other users' view of the model will be changed. Additionally, any action that causes data to be saved to the workspace will be seen by all of the users in the collaboration session. For example, creating new documents, moving documents, minimizing documents, and using tools on documents, are all actions that will be seen by everyone.

Additionally, the collaboration framework may provide communication capabilities such as chat and instant messaging to collaborators 104 in the session.

However, to preserve individual user's preferences, certain actions performed by a user may not be seen by other users in the session. For example, a user's palette 200 may not be part of the collaboration session. Thus, if a user moves his or her palette 200 or drawing tools from the upper left to the lower right, the collaborators 104 will not see a change in their view of the workspace. Further, any object selected by a collaborator 104 may not be seen in the other collaborator's 104 view of the workspace. However, any action done to the object that changes its data (e.g., color or size change) will be seen by the other users. Additionally, the activation of documents may not be seen by collaboration users. For example, if a user has "Drawing 1" active, and is actively placing strokes into it (which is seen by the other users), he or she will not see that another user may have a model document active. However, if the second user begins to rotate the model in the document, the result will be seen by all of the collaborators 104.

The loss of a network 102 connection by a user affects the way the user continues. When a single user of a workspace (i.e., no other collaborators 104 are members of the session) loses his or her network 102 connection, the user may be automatically switched to an offline mode during which the user may keep write-access while offline, and the server 106 marks the workspace as offline so it may not be edited by online users. When a user in a collaborative environment loses a connection, the remaining users will be notified that the user has timed-out with the disconnected status in the data field 106 of the palette. The disconnected user may also receive a dialog notice that the connection to the workspace has been lost, and the user has therefore been switched to read-only mode.

Collaboration Details

As described above, collaborators 104 participating in a session may all modify a drawing document that is stored in the server 106 wherein the drawing modifications are then reflected in the other collaborators' 104 views. To enable such capabilities, the collaboration framework provides for the transmission of commands to the client 104 and server 106 sides of the framework. The description below provides information regarding some of the commands that may be used including background information, implementation information, and formatting information. It should be noted that while the formatting information is described in terms of extensible markup language (XML), any acceptable format or formatting language may be used and the invention is not intended to be limited to XML formatted messages.

There are two types of command communication between clients 104 and server 106 in the framework 100: synchronous and asynchronous.

Synchronous commands are sent from the client 104 to the server 106, and processed immediately. The server's 106 response is a command response containing the processing results.

Asynchronous commands are sent from the client 104 to the server 106, but are not necessarily processed immediately. The server 106 response to the client 104 may contain multiple command responses to earlier client 104 requests, collaboration state changes, collaboration user information, and other data waiting in the client's 104 outgoing message queue. As described below, a command referred to herein as "heartbeat" is an example of such an asynchronous command.

While strictly speaking, there may only be a single command type, there are three distinct types of command messages: Commands, Responses, and Heartbeats.

Commands initiate a request or an action. Commands may typically contain one or more <param\> sub-nodes. Usually, commands are a request from the client 104 to the server 106 to initiate an action or request data.

Responses are commands containing processing results and return data from previously issued commands. There is typically a one to one correspondence for a response to a specific command. For example, a "Version" command likely has a corresponding "Version" response command which is returned to the client 104 and contains data pertaining to the current version of the framework. Responses typically contain a <success \> sub-node, a <rspMsg\> sub-node, and one or more <return\> sub-nodes.

Heartbeats are asynchronous commands that can contain other commands, responses, or collaboration data.

As described above, messages may be implemented in any format. In one or more embodiments of the invention, messages are simple XML structures. Using a login command message from the client 104 as an example, the basic structure is shown below:

```
<msg msgID="1" sessID="1" resID="23058" retry="0">
  <cmd name="Login">
    <param name="username" val="joe smith" />
    <param name="password" val="JoesPswd" />
  </cmd>
</msg>
```

The outermost node, <msg\>, wraps the entire message. A message tag may be required to contain the following attributes in Table 1.

TABLE 1

| Attribute Name | Values | Meaning |
| --- | --- | --- |
| MsgID | Any positive integer. | Client 104 generated numeric identifier of the message. When the message is sent from the server 106 to the client 104, the server 106 echoes the msgID number it is responding to. This pairs the client 104 request and server 106 response message with the same ID. |
| SessID | A valid session ID. | the sessionID. |
| ResID | A valid resource ID. | the resourceID. |
| Retry | A positive integer, or zero. | number of times client has sent this message. |

The first and only sub-node, <cmd\>, contains a single command. This single command may be a heartbeat command, which itself may contain sub-commands. The command node may contain multiple attributes including a name that specifies a unique command name for the command being sent.

Additionally, each <cmd\> node may contain one or more of the sub nodes described in Table 2, depending on it's type:

TABLE 2

| Sub Node Name | Contains | Attributes |
| --- | --- | --- |
| Param | A parameter for the command. | Name - the parameter name. Val - the parameter's value. |
| Filedata | An XML file of a non-specific type. Currently used for user data, workspace files and Workspace Trees. | NONE. |
| Success | Found only in response commands, this contains a flag indicating whether the command was executed successfully. If it was not, the attribute contains a constant indicating the nature of the failure. | Val - return value. The constant names and values:<br>RESPONSE_SUCCESS = 0x0<br>RESPONSE_LOGIN_REQUIRED = 0x1<br>RESPONSE_FAILURE = 0x2<br>RESPONSE_RESOURCE_NOT_FOUND = 0x3<br>RESPONSE_INSUFFICIENT_PERMISSION = 0x4<br>RESPONSE_DUPLICATE_NAME = 0x5<br>RESPONSE_BAD_TOKEN = 0x6<br>RESPONSE_UNKNOWN_FILETYPE = 0x7<br>RESPONSE_SYSTEM_FAILURE = 0x80 |
| Return | Found only in response commands, this contains return values for the previous commands. There may be more than one return node per response message. | Name - the return parameter's name. Val - the value of the return parameter. |
| RspMsg | Found only in response commands, this contains text corresponding to the result. It may be used for providing error description text to be displayed to the user, for example. | Val - the text of the response message. |

Accordingly, for each command, whether issued by a client 104 or a server 106, the command name is specified along with optional parameters. The following XML illustrates an example of a version command in accordance with one or more embodiments of the invention:

```
<!-- Client request command -->
    <cmd name="Version">
        <param name="major" val="1" />
        <param name="minor" val="1" />
        <param name="revision" val="2" />
    </cmd>
```

```
<!-- Server response command -->
    <cmd name="VersionResp">
        <success val="1" />
        <rspMsg val="a resp mesage" />
        <return name="VersionResp">
            <param name="major" val="1" />
            <param name="minor" val="1" />
            <param name="revision" val="1" />
        </return>
    </cmd>
```

As illustrated, the client 104 request command name is "Version" and various parameters are specified. In response, the server 106 specifies the command name along with information described in Table 2 (i.e., a success with a value of 1, a response message with a value of "a resp message", a return name with a value of "VersionResp", and various parameters with values).

Synchronous Commands: Client Sent, Server Processed

Various synchronous commands may be processed in the framework 100 of the invention. The synchronous commands described below are commands sent by a client 104 and processed by a server 106.

Version Command

The "version" command results in a return of the current version number of the framework. The syntax for the command is:
version(localmajor, localminor, localrevision: major, minor, revision, upgradeFlag, ChangesXML: success, message)

The "version" command is sent by the client 104 at startup, before attempting a login or displaying the main application window. Even if the client 104 has a stored session id, it should issue this command first.

The upgradeFlag indicates the result of the version check and can be VersionsIdentical (0), ServerUpgraded (1), ClientUpgradeAvailable (2), ClientUpgradeRequired (4). If the upgradeFlag has a VersionsIdentical value, no code in the framework 100 has been updated since the last time the client 104 collaboration application 108 was run. If the upgradeFlag has a ServerUpgraded value, the server 106 has new code that may affect the clients 104 perception of how the framework 100 works (faster save times, fixes, etc.), but there are no client 104 binary changes.

A value of ClientUpgradeAvailable means that there is a newer version of the client 104 available, but the client 104 is not required to get the newer version in order to work with the current version of the server 106 (i.e. no file formats or interfaces have changed). A value of ClientUpgradeRequired means that significant changes have occurred in the client 104 and file formats or interfaces with the server 106 have changed. Accordingly, the client 104 must upgrade before the client 104 can go online. Note that this does not necessarily mean the client 104 is forced to upgrade immediately. Instead, the client 104 may be able to work offline using the local cache until the user is ready to upgrade. However, if the client 104 desires to obtain data from the site/server 106, the client 104 must upgrade.

Also, any new features and/or noteworthy fixes that have been implemented since the version of the client 104 passed in will be returned in the ChangesXML parameters, and these changes can be displayed in the client 104. It may be possible to have some updates and not require an upgrade. For example, there may have been server-only changes that would be nice to let the user know about (e.g., a bug fix or improved performance). The ChangesXML may be useful to users when the value of upgradeFlag is ClientUpgradeAvailable, since the ChangesXML content is what provides the basis upon which the client 104 decides if the upgrade should be made (new features and fixes vs. risk assessment). Further, the ChangesXML value does not need to be overly verbose. For example, the ChangesXML value may comprise a short bulleted list containing only changes that the average user would care about, or possibly a hyperlink pointing to a page on a web site that may be accessed for more detailed information.

In response to the version command, an object is returned with the current version numbers that may be read from a local versions XML file. Alternatively, a data cache product may be used such that the version numbers are stored in a database 114 and read from the cache. Thereafter, collaboration application stores the returned major/minor/revision numbers and ensures that the returned numbers are used in the next version command.

The versions XML file may contain all changes over time (occasionally pruned manually) and will be read by the application server 110 at start time and stored globally into an efficiently searched data structure that may be keyed by major.minor.revision. Each one of the database 114 entries may have an upgradeFlag that will be set to one of the levels defined above. The upgradeFlag's values may be binary to ease in the use of a bitwise OR operation. Each entry may also contain any number of new feature/fix nodes, and each node might specify an attribute classifying the type (new feature vs. enhancement vs. fix, etc). When processing a version command, if the major/minor/revision passed in is lower than the current maximum parsed from the file, then an update has occurred and an upgrade may be required.

The upgradeFlag is determined by a simple bitwise OR operation of all upgradeFlags of the versions greater than the version passed in. The ChangesXML is built in a similar way, by combining all of the change nodes for the versions greater than the one passed in. If the provided version is not found, then the version has been pruned, and the earliest version in the data structure is used to determine the upgradeFlag and the ChangesXML.

The version command likely executes quickly and efficiently and avoids a Denial of Service attack, since no login is required. Accordingly, the version command does not perform any database 114 read operations, database 114 write operations, and only performs a single remote method invocation (RMI) call.

Login Command

The login command is executed by the client 104 at startup to logon to a session. In one or more embodiments, the login command is used when the user does not have a session id, or when the user determines that the sessionid that the user has is invalid. Such a login may be required in when the server 106 requires the client 104 to logon (e.g., during the processing of a loginrequired command from the server 106 [see below]). The syntax for the login command is:

login(username, password: success, message, sessionID, userID, imageURL)

In response to a login command, the server 106 returns a new sessionID and the userID to the client 104. The same user can be logged on multiple times and have multiple active sessionID's.

Open User Data Command

Once logged in pursuant to the login command, the client 104 will next transmit the Open User Data command. More particularly, if the client 104 has a cached sessionID from a previous instance, the client 104 will first try this sessionID. If the prior sessionID fails, the client 104 will receive a login-required command from the server 106 in response. The subsequent login (i.e., using the login command) provides a sessionid to be used with the Open User Data command. The Open User Data command opens specified user data for the client 104.

New Workspace Command

This command is used by a client 104 whenever the user selects an option to create a new workspace/document. The newworkspace command is executed before the closeworkspace command of an open workspace (if there is one open) is executed. If the newworkspace command is successful, the resourceID of the new workspace is returned, and the workspace should be considered to be in a SoloPending state for the specified user.

Copy Workspace Command

The copy workspace command is issued by the client 104 whenever the user selects an option to copy a workspace.

Delete Workspace Command

The delete workspace command is issued by the client 104 whenever the user tries to delete a workspace that the user has opened. The delete workspace command is executed before the closing an open workspace. If successful, the deleted workspace will be gone and the user will have to select a workspace to work on or create a new workspace. The use of the delete workspace command may be restricted. For example, the delete workspace command may not execute if the workspace is in CollabPending or Collab state. Accordingly, in order to delete a workspace, the user must be the only person in the workspace. The syntax for the delete workspace command is:

deleteworkspace(userID, resourceID: success, message)

To enable the delete workspace command, the server 106 may ensure that the workspace is either open by nobody, or open by exactly the user trying to delete it. The user must also have the appropriate permissions. If all of these conditions have been complied with, then the delete workspace command will delete the workspace and remove the workspace from a ResourceSession. Once deleted, the workspace cannot be opened at a later time.

Open Workspace Command

The open workspace command is the backbone of collaboration, and occurs whenever the client 104 opens a new workspace. The command is issued by the client 104 before the closeworkspace command when switching workspaces. If the workspace is already open by two or more users (i.e., the workspace is in Collab state), then this user joins the collaboration session. If the workspace is open by only one person (i.e., the workspace is in Solo state), then a collaboration session is started (CollabPending state) and both clients 104 are synchronized. Once synchronized, the state changes to Collab. If the workspace is not open, the user (that is in SoloPending state) marks the workspace as open.

A workspace session and user's workspace session may be in one of the following states: 0—Solo Pending; 1—Solo; 2—Collab Pending; 3—Collab; or 4—Disconnected. When a workspace is not open, the workspace has no state. When the workspace is opened, the workspace transitions into Solo Pending, as does the workspace's user.

Upon the new user's/client's 104 heartbeat, the state is transitioned from Solo Pending to Solo. If another user opens the document, the state is transitioned to Collab Pending. Once the original client 104 confirms synchronization of the document, the state is transitioned to Collab. If another user joins, the workspace remains in Collab state, but the user is in Collab Pending until the first heartbeat is received, at which time the client 104 is transitioned into full Collab.

If at any point enough users close the workspace such that there is only one client 104 left, the state is transitioned into Solo Pending for that user and the workspace. Once this client 104 confirms synchronization of the document and started creating deltas, the state is transitioned into Solo for the workspace and the user. If at anytime a user is determined to have gone link dead, the user's state is changed to Disconnected. If at any time all users left in a workspace session are Disconnected, then the state of the document is changed to Disconnected. Once users have been disconnected for a sufficient time without returning, the disconnected users are removed from the session. If all users are removed from a session, the session is closed.

Close Workspace Command

The close workspace command is executed when a user closes a workspace. If the user is closing the workspace due to opening an existing or creating a new workspace, then the open or create commands are executed first, and the close executing after their success. If the user closes the application, closeworkspace is sent after the final save.

While processing this command, if the state is Collab then a collabuserinfo command may be placed in the Command-Out queues of the remaining workspace session users. If there is only one other workspace session user, then the state of the workspace session may be changed from Collab to Solo Pending.

Get Object IDs Command

The Get Object IDs command is issued by a client 104 to obtain a range of unique Object IDs the client 104 can use when creating application objects. A GetObjectIDs command with no parameters is requesting a default number of IDs. The default should be sufficient for typical online work, yet large enough to allow for sufficient IDs in the case of subsequent connection failures so the client 104 can keep working. A "quantity" parameter may be specified to request a specific quantity of Object ID's. Clients 104 can use numeric constants for typical quantities or simply specify a number for the quantity. The syntax for the Get Object IDs command is:

getObjectIDs (userID: success, message, Object ID start, Object ID end)

In response to the command, the server 106 returns a range of object IDs that can be used by the client 104. In other words, a first/start object ID and a last/end object ID are returned by the server 106 for use by the client 104.

The GetObjectIDs command may or may not be utilized depending on the implementation. For example, if the GetObjectIDs command is not utilized, the server 106 may map object IDs as using a Mapped Objects command described in detail below.

Synchronous Responses Server Sent, Client Processed

The commands described below are synchronous commands/responses that are transmitted by a server 106 and processed by a client 104.

Login Required Response

The server 106 generates the login required command whenever processing a message or command and it is determined that the specified sessionID is missing or invalid (timed out). Upon receipt and execution, the client 104 sends a login command to the server 106 (see above).

System Failure Response

The server 106 generates the system failure response/command whenever an internal system failure occurs processing a message or command. Upon receipt of the system failure command, the client 104 takes appropriate measures to retry the command it received the system failure response message for.

Heartbeat Commands

Heartbeat messages are different from other commands, as they may contain sub commands and collaboration data. The heartbeat message uses two sub-nodes to contain the different types of data. These are the <transientcmd\> node, which contains zero or more commands and responses, and the <persistentcmd\> node, which contains actual collaboration data, i.e., the actions performed in the client 104 by the collaborators 104.

As an example, a heartbeat command demonstrating the full structure is shown below, although any individual heartbeat command may or may not have all the components shown below the <cmd\> node. The example shows a heartbeat command with a single SaveUserData sub-command, and a comment in the <persistentcmds\> section where a real message would have one or more client 104 collaboration commands:

```
<cmd name="Heartbeat" deltalevel="45" beat="1"
  strong="0">
  <transientcmds>
    <cmd name="SaveUserData">
      <param name="file"
        val="woof_tools .xml">
        <filedata>
          <!-- user data file xml -->
        </filedata>
      </param>
    </cmd>
```

```
</transientcmds>
<persistentcmds deltalevel="45">
    <!-- client collaboration commands -->
</persistentcmds>
</cmd>
```

The heartbeat </cmd> node may be required to contain the attributes identified in Table 3.

TABLE 3

| Attribute Name | Values | Meaning |
| --- | --- | --- |
| DeltaLevel | The current delta level. In solo mode, this value is determined by the client 104 and echoed by the server 106 in the response. In collaboration mode, these are temporary IDs when sent from the client 104, and actual IDs when sent from the server 106. | See text. |
| Beat | BEAT_TYPE_COLLAB = 1 BEAT_TYPE_SOLO = 2 | A collaboration or solo beat. |
| Strong | BEAT_STRONG = 1 BEAT_WEAK = 0 | The server 106 updates the client 104 last contacted time on Strong beats, whether or not any other data is sent. |

The heartbeat command is executed by the client 104 with a delay between heartbeats of N seconds, where N varies depending if the client 104 is collaborating or not. Tentatively heartbeats may beat execute every 10 seconds when solo and every 2 seconds when collaborating. Occasionally heartbeats will be strong. A strong heartbeat signifies that even if no data modification commands (referred to as delta commands) are sent in the heartbeat, the users' workspace session should be marked as active so that it does not timeout. For example, if a client 104 does not perform any modifications or is away from the keyboard for 20 minutes while in a collaborative session, the client 104 won't be generating any data but the strong heartbeats will keep the client's 104 workspace session alive.

The syntax for the heartbeat command is:
heartbeat(userID, resourceID, deltaLevel, strongflag: transientcmds, persistentcmds[deltalevel])

The heartbeat may contain either transient commands, persistent commands (i.e., delta commands), or both. Transient commands are executed immediately and persistent commands are stored for asynchronous processing by a separate server-side process. Some transient heartbeat commands are described below.

If the heartbeat comes from a solo user of the workspace, then the DeltaID's will already be present, and the specified DeltaLevel will represent the new DeltaLevel of the workspace. If the heartbeat comes from a collaborator 104, then none of the delta commands will have a DeltaID, and the server 106 is responsible for numbering them. In either case, the DeltaLevel of the workspace session needs to be updated. If the heartbeat comes from a collaborator 104, then the heartbeat response will contain any delta commands that the server 106 has received that are higher than the clients 104 specified DeltaLevel, and this will include new delta commands that the client 104 just sent. Accordingly, the heartbeat command enables the client 104 to receive the work done by another client 104 during a session.

If the client 104 is collaborating, then any new ObjectID's specified in the delta commands will be temporary and will be marked as such. Temporary ObjectIDs are mapped to real server-generated ObjectID's, and a persistent map is maintained for each user mapping the user's temporary ObjectID to the real ObjectID. When collaborating, the response to a user's heartbeat command will contain the same persistent commands that came up in the command, but with DeltaID's and real ObjectID's set in them, so that the client 104 can update itself.

Part of the persistent commands node is the delta level that the client 104 is currently at. In the collaborative case, there may be delta commands that a client 104 has received from other users that have been given DeltaID's that this client 104 may not yet have. Therefore, the response message may contain not only the updated DeltaID's that this client 104 generated, but it may also contain those DeltaIDs specified by other clients 104, all in the correct DeltaID order.

Depending on the implementation, the heartbeat processing may utilize a beat flag for the status of a particular client 104. The beat flag is utilized to maintain the appropriate state between clients 104 and to facilitate the collaboration between clients 104. Such heartbeat processing utilizing a beat flag is described in detail below.

Alternatively, instead of using a flag to maintain the state of a client 104, the heartbeat processing may result in the generation of several different collaboration transient commands that are sent to the client 104. If the client's 104 state is Solo but the sessions state is Collab Pending, then the client 104 may receive a collabstart command. If the client's 104 state is Collab but the sessions state is Solo Pending, then the client 104 may receive a collabstop command. If the client's 104 state is Joining but the sessions state is Collab, then the client 104 may receive a collabjoined command.

The user may also have other transient commands that have been queued up in a queue of outgoing commands for a particular user (referred to as a user's CommandOut queue) waiting for this heartbeat (for example, somebody may have joined the collaborative session, left the collaborative session, etc). These transient commands in the CommandOut queue are sent from the server 106 to the client 104 in the response message, and marked in a record of the session as having been sent in this particular message ID.

A retry count for each message may also be maintained. During heartbeat processing, the retry count of the message may be checked. When the message is not a retry, message responses to all previous messages have been received and processed by the client. Therefore, if there are any transient commands in the CommandOut queue which are marked as sent in a previous message, such transient commands can be removed from the queue.

The following transient heartbeat commands are transmitted by a client 104 and processed by the server 106.

Save User Data

The save user data command is executed by the client 104 when a session is closed and optionally during sessions as user preferences/options change. The save user data command may execute based on an interval and a dirty flag. If the time interval has passed and the flag/preferences are dirty, then the preferences are saved.

The save user data command uses a user ID, filename, and file data as parameters. The filename should be a valid system file type, otherwise the operation to store/save the data may fail. If a failure occurs, a saveuserdatafailed command will likely be generated and returned in the response message.

Save Workspace Command

The save workspace command is generated by any client 104 that has a non-read-only workspace open. When solo, the client 104 is responsible for sending up all delta commands in the persistent section of a heartbeat command that will update the server 106 from the previous delta level to the new delta level specified. If any of the delta commands are missing, the save will fail.

In collaborative mode, the detalLevel is the latest server-approved delta level of the workspace that the client 104 is aware of. Therefore, the client 104 does not need to transmit persistent commands to update the workspace, since the server already has the delta levels. All clients 104 in a collaboration session may issue the saveworkspace command. Further, saves may occur at a regular interval (e.g., every 1 minute). Accordingly, solo saveworkspace commands come up pursuant to regular heartbeat intervals (e.g., 6 heartbeats), and when collaborating saveworkspace commands are likely issued at greater heartbeat intervals (e.g., every 30 heartbeats).

Collaboration Start Confirmation Command

As described above, various transient collaboration commands may or may not be utilized depending on the implementation. The collaboration start confirmation command may be generated by a client 104 upon receiving and executing a collabstart command. The command occurs only when going from the solo to collaborative mode (i.e., from 1 document viewer to 2). When the server 106 receives this command, the client 104 is signaling that the client 104 has stopped generating delta commands that have DeltaID's, and that it is now the servers 106 responsibility to generate the delta commands. The collaboration start confirmation command typically arrives in the same message as the clients 104 final solo saveworkspace. Subsequent to execution, heartbeats contain delta commands without DeltaID's, and all new ObjectID's are temporary.

Once the server 106 receives the start collaboration confirmation command, the user or users that are in the Joining state can be migrated to the Joined state (they are issued collabjoined commands), as well as placing collabuserinfo commands into the CommandOut queues of all users in the workspace session for all of the users that just Joined. The workspace session state may also be updated from Collab-Pending to Collab.

Collaboration Stop Confirmation Command

The collaboration stop confirmation command is generated by a client 104 upon receiving and executing a collabstop command from the server 106. This command is only executed when going from the collaborative mode to the solo mode (i.e., from 2 or more document viewers to 1). When the server 106 receives this command, the client 104 is signaling that the client 104 has started generating delta commands that have DeltaID's, and that it is no longer the servers' 106 responsibility to generate delta commands. Subsequently, heartbeats executed by the client 104 contain delta commands with client 104 generated DeltaID's, and all new ObjectID's are real and not temporary.

Once the server 106 receives the collaboration stop confirmation command, the user or user may be migrated from the Pending Solo state to the Solo state. Additionally, the workspace session state may be updated from SoloPending to Solo.

Collaboration Joined Formation Command

The collaboration joined formation command (referred to as collabjoinedconfirm) is generated by a client 104 upon receiving and executing a collabjoined command. A collabjoined command is only received when the user's state transitions from the collaborative pending state to the collaborative mode state. When the server 106 receives the collaboration joined formation command, the client 104 is signaling that the client 104 has received the collabjoined command and is now generating delta commands (unnumbered).

Once the server 106 receives the collaboration joined formation command, the user is likely migrated from the Pending Collab state to the Collab state.

Mapped Objects Command

Depending on the implementation, a mapped objects command may or may not be provided. For example, if a Get Object IDs command (as described above) are implemented, the Mapped Objects Command may not be utilized. As described above, the GetObjectIDs provides the client 104 with a pool of valid IDs which are guaranteed unique. Accordingly, there is no need for the server 106 to map the objects to IDs. However, without the GetObjectIDs command, such mapping may be necessary.

The purpose of the mapped objects command is so that the server 106 can truncate the real-to-temp ObjectID maps for each client's 104 workspace session once the client 104 has acknowledged that the real ID's have been received. Accordingly, the mapped objects command may only be used when in a collaborative mode. Further, the command is originally server 106 generated and simply forwarded back up to the server 106 by the client 104. By making a trip through the clients' 104 queues, once received by the server 106, any temporary ObjectID's in the command are no longer in use by the client 104. Accordingly, temporary ObjectIDs may be removed from a state map of the server 106.

The removal of a temporary ObjectIDs causes object mapping to run considerably faster when processing commands from active clients 104 who are generating numerous delta commands. Without the mapped objects command, the mapping table may continue to grow unchecked.

The execution of the mapped objects command may contain a series of elements, with a tempID and realID attribute/value pair. The elements are parsed and the tempID's are placed into a string. The string may then be transmitted to a single server 106 processor (along with the userID and resourceID) that can efficiently delete all of the temporary objects efficiently.

In addition to transient commands sent by a client 104 and processed by a server 106, the following transient commands are transmitted by the server 106 and processed by a client 104.

Collaboration Start Command

The server 106 generates the collaboration start command while processing a heartbeat if the heartbeat originated from a solo client 104 and the state of the workspace session has been changed to Pending Collab. The collaboration start command signals that a collaborative session is beginning so that the client 104 can begin the transition from the solo state to the pending collaboration state. Once the client 104 has finished this transition, the client 104 will issue a collabstartconfirm command to the server 106 as described above.

Collaboration User Information Command

The server 106 generates the collaboration user information command in response to every heartbeat for a user in a collaborative session. This command contains all of the data regarding users currently in the session including disconnected (link dead) users. It is the client's 104 responsibility to compare the data structure to previously received data structures to figure out what users are new, what users are gone, what users had state changes, what users had icon changes, etc., and then render appropriately.

Collaboration Joined Command

The server 106 generates the collaboration joined command while processing a heartbeat command. If the heartbeat comes from a joining client 104 and the state of the workspace session is Collaborating, then this command is generated and returned on the heartbeat.

Collaboration Stop Command

The server 106 generates the collaboration stop command while processing a heartbeat command if the specified userID is the only user left in the workspace session. The command signals that the collaborative mode should stop, and that the client 104 should enter the pending solo mode and signal to the server 106 that the client 104 has sent up all of the client's 104 un-numbered delta commands.

Beat Flag

The various transient collaboration commands described above (e.g., Collaboration Start Confirmation Command, Collaboration Stop Confirmation Command, Collaboration Joined Formation Command, Collaboration Start Command, Collaboration User Information Command, Collaboration Joined Command, and Collaboration Stop Command) may not be utilized in one or more embodiments of the invention. Instead, a flag may be used in the Heartbeat command that maintains state information for clients 104.

At the server 106 level, the state of the workspace itself as well as the state of the client 104 may be considered. However, each client 104 only needs to keep track of their own state. The state may be described using the following values: 0=closed, 1=disconnected, 2=solo pending, 3=solo, 4=collab pending, and 5=collab.

Upon executing an open workspace command, the client 104 is placed in one of two states: solo pending or collab pending. The heartbeat command always echoes this state to the server 106. In turn, the server 106 will update the value of this flag after examining the state of the workspace and the state of the users in the session.

An example of three clients collaborating using the various flags are illustrated in Table 4.

TABLE 4

| Command | Client1 | Client2 | Client3 | Server Workspace | C1 | C2 | C3 |
|---|---|---|---|---|---|---|---|
| 1. Client1 executes open workspace | 2 | | | 2 | 2 | | |
| 2. Client1 heartbeats | 3 | | | 3 | 3 | | |
| 3. Client2 executes open workspace | 3 | 4 | | 4 | 3 | 4 | |
| 4. Client1 heartbeats | 4 | 4 | | 4 | 4 | 4 | |
| 5. Client2 heartbeats | 4 | (no changes) 4 | | 4 | 4 | 4 | |
| 6. Client1 heartbeats | 5 | 4 | | 5 | 5 | 4 | |
| 7. Client2 heartbeats | 5 | 5 | | 5 | 5 | 5 | |
| 8. Client3 executes open workspace | 5 | 5 | 4 | 5 | 5 | 5 | 4 |
| 9. Client3 heartbeats | 5 | 5 | 5 | 5 | 5 | 5 | 5 |
| 10. Client2 executes close workspace | 5 | 0 | 5 | 5 | 5 | 0 | 5 |
| 11. Client3 executes close workspace | 5 | 0 | 0 | 2 | 5 | 0 | 0 |
| 12. Client1 heartbeats | 2 | 0 | 0 | 2 | 2 | 0 | 0 |
| 13. Client1 heartbeats | 3 | 0 | 0 | 3 | 3 | 0 | 0 |

As illustrated in Table 4, the values in each row are the final values after successful execution of each command indicated.

The first user in a workspace session must confirm (e.g., by issuing a heartbeat command with a collab pending flag) to synchronize all deltas and start a collaboration session. The client 104 always checks the flag returned from the server to determine whether it should change its current state or not.

The command executed in Table 4 and the actions taken may resemble the transient collaboration commands described above in the following manner:

Step 3 (Client2 executes open workspace) is the equivalent of the collab joined command (sent by the server 106).

Step 4 (Client1 heartbeats) is the equivalent of the collab start command (set by the server 106).

Step 6 (Client 1 heartbeats) is the equivalent of the collab start confirm command (sent by client 104).

Step 7 (Client2 heartbeats) is the equivalent of the collab joined confirm command (sent by client 104).

Step 12 (Client1 heartbeats) is the equivalent of the collab stop command (sent by server 106).

Step 13 (Client1 heartbeats) is the equivalent of the collab stop confirm command (sent by client 104).

By using the beat flag in this manner, transient collaboration commands are not needed between a client 104 and a server 106. Further, the beat flag provides a mechanism to maintain state information for each client 104 in a collaboration session without the use of extraneous communications between the client 104 and server 106.

Save User Data Failed Command

The server 106 generates the save user data failed command when the processing of a saveuserdata command fails for reasons other than system failure (system failures are handled separately and consistently for all commands/messages). For example, some causes for the saveuserdata command failing may include invalid filename specified or invalid userID specified.

Save Workspace Failed Command

The server 106 generates the save workspace command when the processing of a saveworkspace command fails for reasons other than system failure. Failed commands due to system failures are handled separately and consistently for all commands/messages. For example, some of the causes for the failure of the saveworkspace command may include: invalid userID specified, invalid resourceID specified, no access, and possibly workspace not open.

Collaboration Flow

As described above, numerous commands may be used as part of the collaboration framework to enable multiple users to simultaneously access and modify an actual document that is stored on a server 106. Further, the collaboration application 108 and server application 110 enable the use of a full set of three-dimensional tools to modify a drawing while in a collaboration session.

The server 106 also maintains a history of all modifications to the document. Using the history, a client 104 may undo any client's 104 modification to a drawing document/workspace. Further, in the event of a network or system failure, the history can be used to rebuild/regenerate a document including all modifications on any client 104 by recommunicating commands received from a client 104 to collaborators 104 in a session. To provide such functionality, in addition to the history, the server 106 may maintain a record of the collaboration session including the name, numbers, and statuses of collaborators 104 in the session.

Figure 4:
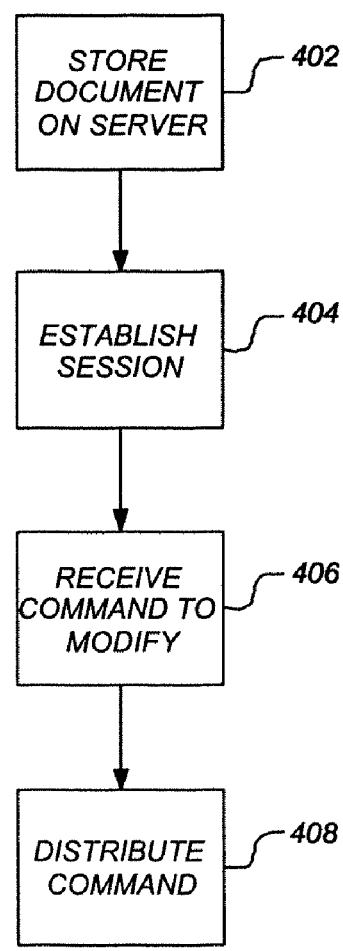
FIG. 4 is a flow chart illustrating the use of the collaboration framework in accordance with one or more embodiments of the invention.

FIG. 4 is a flow chart illustrating the use of the collaboration framework in accordance with one or more embodiments of the invention. At step 402, a document/workspace is stored on a server 106. At step 404, a collaboration session is established. During a session, the server 106 permits two or more collaborators 104 on a network 102 to work simultaneously across the network on the drawing document stored on the server 106 (e.g., all of the collaborators 104 have write-access for the drawing document during the session). A collaboration palette may be displayed to collaborators 104 in the session that provides information relating to the collaborators 104 in the session (e.g., the name of each collaborator 104, status of each collaborator 104, an icon for each collaborator 104, etc.).

At step 406, the server 106 receives a command (e.g., an XML formatted command) to modify the drawing document from a collaborator 104 in the session. Such a command may be invoked pursuant to the collaborator's 104 use of a tool selected from a full set of drawing modification tools. The command may identify an object in the drawing document that the collaborator 104 has modified.

At step 408, the server 106 distributes the command to modify the drawing document to the other collaborators 104 in the session. Such a distribution may be pursuant to regularly transmitted commands (e.g., heartbeat commands as described above) received from collaborators 104 in the session. Further, as part of the command's distribution, an identifier may be assigned to the command and distributed with the command to the collaborators 104. The client 104 then uses the identifier to determine whether the command has already been reflected in its display or not.

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for one or more users to collaborate on an actual stored drawing document across a network, comprising:
   (a) maintaining a single actual stored drawing document on a server;
   (b) the server establishing a collaboration session wherein multiple users on multiple client computers collaborate in real time and dynamically view modifications, executed by any one of the multiple client computers to a local copy of the single actual stored drawing document, performed in real time by any one of the multiple users on the client computers in the collaboration session, wherein during the collaboration session:
      (i) the multiple client computers maintain simultaneous write access to the single actual stored drawing document;
      (ii) asynchronous commands are received by the server that are generated and transmitted from one or more of the multiple client computers, wherein the asynchronous commands:
         (1) have a delay between each asynchronous command of a fixed time period, wherein the fixed time period depends on whether the one or more client computers comprise a single client computer or multiple collaborating client computers having one specific value for a single client computer and a different specific value for multiple collaborating client computers;
         (2) include any modifications made in real time by the user on the client computer that is transmitting the asynchronous command;
         (3) cause the server to transmit any modifications to all of the multiple client computers in the collaboration session;
         (4) the asynchronous commands comprise a strong heartbeat received from a transmitting client computer;
         (5) the strong heartbeat command does not comprise a data modification command;
         (6) in response to receipt of the strong heartbeat, the server will not timeout a workspace session of the transmitting client computer and will not mark the workspace session as inactive; and
      (iii) the server maintains a history of all modifications to the actual stored drawing document, wherein any of the one or more multiple client computers in the collaboration session can undo any user's modifications using the history.

2. The method of claim 1, further comprising the server maintaining a record of the collaboration session including name, numbers, and statuses of the two or more collaborators.

3. The method of claim 1, wherein the command specifies an object identifier for an object in the drawing document that is modified.

4. The method of claim 1, wherein an extensible set of three dimensional modeling tools for modifying the drawing document is supported on all of the users in the collaboration session.

5. The method of claim 1, wherein:
   (a) the asynchronous command comprises a data modification command;
   (b) if the data modification command is received from a non-collaborating client computer, the data modification command comprises a level of a workspace for the single actual stored drawing document; and
   (c) if the data modification command is received from one of multiple collaborating client computers:
      (1) the data modification command does not comprise the level of the workspace; and
      (2) the server assigns the level to the workspace and transmits the data modification command and the level to the multiple collaborating computers.

6. The method of claim 5, wherein:
   the server transmits the data modification command and the level to specific multiple collaborating computers whose client level is lower than the level assigned by the server.

7. The method of claim 1, wherein each of the asynchronous commands received from each of the multiple collaborating client computers comprises a corresponding level of a workspace for the transmitting client computer.

8. A method for one or more users to collaborate on an actual stored drawing document across a network, comprising:
   (a) one or more multiple users on multiple client computers collaborating in a collaboration session across a network, via a server, to modify a single actual stored drawing document maintained by the server, in real time, wherein the one or more multiple client computers dynamically display modifications, executed by any one of the multiple client computers to a local copy of the single actual stored drawing document, performed in real time by any one of the multiple users on the client computers in the collaboration session, wherein during the collaboration session:

(i) the multiple client computers maintain simultaneous write access to the single actual stored drawing document;

(ii) two or more asynchronous commands are transmitted by each of the multiple client computers to the server, wherein the two or more asynchronous commands:
  (1) have a delay between the asynchronous commands of a fixed time period, wherein the fixed time period depends on whether the one or more client computers comprise a single client computer or multiple collaborating client computers having one specific value for a single client computer and a different specific value for multiple collaborating client computers;
  (2) include any modifications made in real time by the user on the client computer that is transmitting the asynchronous command;
  (3) cause the server to transmit any modifications to all of the multiple client computers in the collaboration session;
  (4) the asynchronous commands comprise a strong heartbeat received from a transmitting client computer;
  (5) the strong heartbeat command does not comprise a data modification command;
  (6) in response to receipt of the strong heartbeat, the server will not timeout a workspace session of the transmitting client computer and will not mark the workspace session as inactive; and (iii) any of the one or more multiple client computers in the collaboration session can undo any user's modifications using a history of all modifications to the actual stored drawing document, wherein the history is maintained by the server.

9. The method of claim 8, wherein the asynchronous command specifies an object identifier for an object in the drawing document that is modified.

10. The method of claim 8, wherein an extensible set of three dimensional modeling tools for modifying the drawing document is supported on all of the users in the collaboration session.

11. The method of claim 9, wherein:
(a) the asynchronous command comprises a data modification command;
(b) if the data modification command is transmitted from a solo non-collaborating client computer, the data modification command comprises a level of a workspace for the single actual stored drawing document; and
(c) if the data modification command is transmitted from one of multiple collaborating client computers:
  (1) the data modification command does not comprise the level of the workspace;
  (2) the level is assigned to the workspace by the server; and
  (3) one or more of the multiple collaborating client computers receives the data modification command and the level in response.

12. The method of claim 11, wherein:
specific client computers of the multiple collaborating client computers receive the data modification command and the level, wherein the specific client computers comprise client computers whose client level is lower than the level assigned by the server.

13. The method of claim 8, wherein each of the asynchronous commands transmitted from each of the multiple collaborating client computers comprises a corresponding level of a workspace for the transmitting client computer.

* * * * *